Aug. 6, 1957  J. ADAMS, JR  2,801,452
BELT SPLICE
Filed Jan. 11, 1954
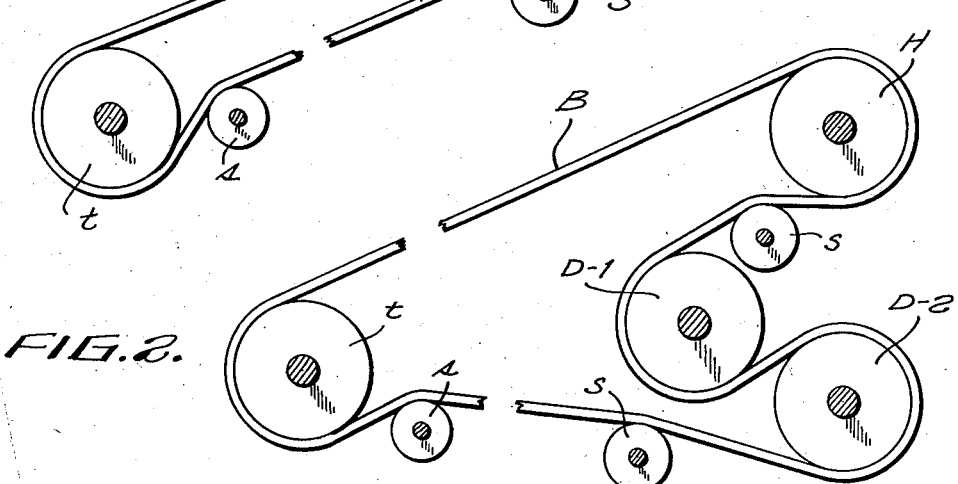
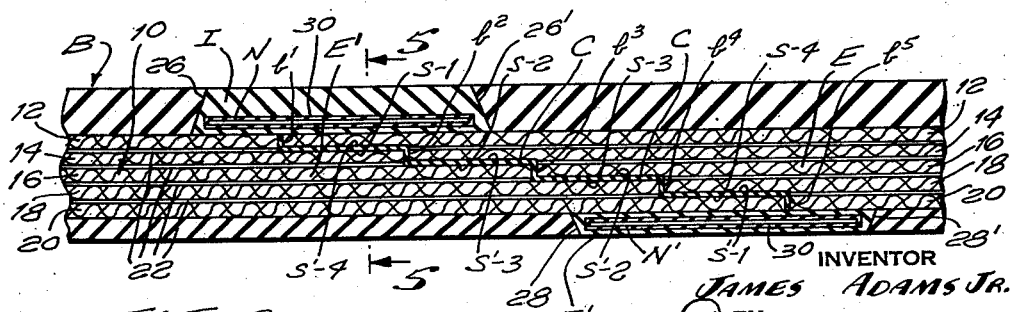
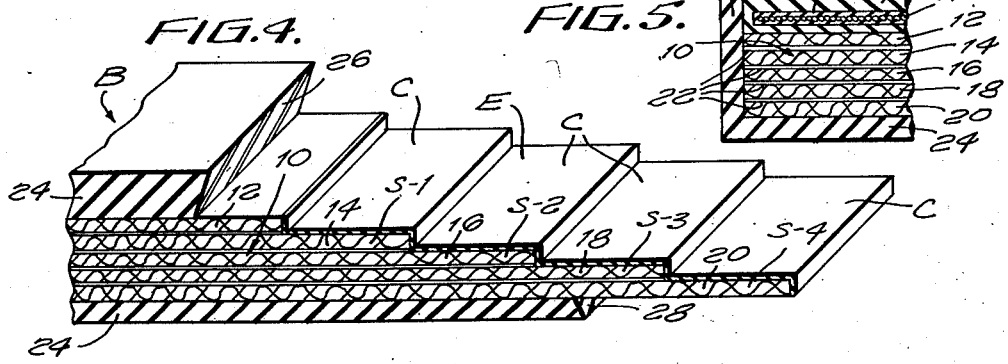
INVENTOR
JAMES ADAMS JR.
BY
ATTORNEYS United States Patent Office 2,801,452
Patented Aug. 6, 1957

2,801,452
BELT SPLICE

James Adams, Jr., Packanack Lake, N. J., assignor to Raybestos-Manhattan, Inc., Passaic, N. J., a corporation of New Jersey Application January 11, 1954, Serial No. 403,229

7 Claims. (Cl. 24—38)

This invention relates to belt splices and more particularly to an improved belt splice in a laminated belt structure.

Laminated belt structures for use as conveyor and power belts are made up of a series of laminated plies of fabric bonded together by cement or a rubber coating composition and provided with a rubber cover or envelope vulcanized thereto. A common method of joining the ends of the belt to produce a continuous structure consists of shaping the plies at one end of the belt to produce a step formation and the plies at the other end of the belt to produce a reverse step formation and uniting the meeting ends of the reverse steps in a butt joint thus producing a stepped butt splice.

Such belts are customarily driven either by a single head pulley drive system, with a snub pulley to increase the arc of contact over the head drive pulley, or by a dual or tandem drive system, which latter is a combination of a head pulley, two drive pulleys and snub pulleys. In the operation of the former a relatively high tension reversal is given to the belt at the drive elements; and in the latter two high tension reversals and one lower tension reversal is given to the belt at the drive elements. When a belt is flexed over any of the pulleys the outside ply is extended most and normally carries a greater share of the load than any of the other plies, the tension being progressively decreased in the plies going from the top to the bottom of the belt. In a flexing reversing cycle, each side of the belt in turn (first the top and then the bottom) becomes the outside with reference to the pulley and thus the outside plies on both sides of the belt are subjected to the maximum extension and tension in a reversing cycle. The tension differential effective as between the top and the bottom plies is normally substantial for a given pulley diameter and this differential also increases inversely with respect to the pulley diameter.

These tensions which are effective on a power or conveyor belt in a flexing or/and reversing cycle exert their greatest influence at the weakest link of the belt, namely, at the belt splice; and most frequent breakdowns of belt operation occur from deterioration and breaking of the splice structure. Increasing the strength of the belt at the splice region has, therefore, been an ever present problem.

The most highly stressed ply of the belt, when the belt is under tension over the pulley, is, of course, the topmost or outside ply. However, I have experimentally determined, and I have found the same supported by mathematical confirmation, that considering the whole splice area, the stress of the topmost or outside ply (when over a pulley) is at or increases to a maximum amount at the region of the belt directly over the butt splice in the ply beneath the topmost ply. I have, therefore, found experimentally that in a stepped butt splice arrangement, the weak spot or most frequent point of failure is at the second butt end of the splice, i. e., the belt region at the butt end of the second or next to the top (outside) ply of the laminae of the belt.

Based upon this experimental determination, I have found further that by incorporating or embedding in the rubber cover adjacent the outside belt ply a reinforcing fabric member which extends locally over and bridges such butt end of the ply beneath the topmost ply, this weak spot is so strengthened as to effectively eliminate breakdown trouble from this source. For the most effective reinforcing fabric I employ a nylon fabric made up of nylon cords, such fabric being most suitable because, in addition to its strength, its elongation and compression characteristics are compatible with those of the rubber cover in which it is embedded and are admirably suited to the tension and compression which have to be sustained by the outside ply of the belt laminae. It is desirable to limit the longitudinal extent of the reinforcing member; and while to effectuate this it may only be necessary to have the reinforcing member extend over and bridge the butt end of the said second ply, I have found that the reinforcing member may be extended to also include the butt end of the first or top (outside) ply of the belt laminae; and it is this most preferred form of construction that is disclosed in the embodiment described herein. Preferably also both the top and the bottom of the belt are provided in their correponding areas or regions with this reinforcing improvement so that the belt may operate in the same manner on its opposite sides during a reversal flexing cycle.

The prime object of the present invention centers about the provision of an improved belt splice made according to these described principles and to a method of producing such a belt splice.

To the accomplishment of this object, and such other objects as may hereinafter appear, my present invention relates to the belt splice structure as sought to be defined in the appended claims taken in the light of the following specification and illustrated in the accompanying drawings in which:

Fig. 1 and Fig. 2 are views exemplifying a single drive system and a dual or tandem drive system, respectively;

Fig. 3 is a view of a belt splice structure embodying the present invention, the same being shown in longitudinal cross-section;

Fig. 4 is a perspective view of one of the belt ends illustrating the manner of preparing the same in a step in the method of producing the belt splice; and Fig. 5 is a fragmentary view of the belt splice taken in cross-section in the plane of the line 5—5 of Fig. 3.

Referring now more in detail to the drawings and having reference first to Figs. 1 and 2 thereof, there is shown in Fig. 1 a single head drive system for a belt such as a conveyor belt B, such drive system utilizing a single head pulley H and a snub pulley S, the latter arranged so as to increase the arc of contact over the head drive pulley H. The rear end of the conveyor belt is trained over a tail pulley $t$ and a snub pulley $s$. In the dual or tandem drive system shown in Fig. 2 the drive elements comprise the head pulley H, a first drive pulley D-1, a second drive pulley D-2 and snub pulleys S, S, the rear end of the conveyor belt being similarly trained over a tail pulley $t$ and a snub pulley $s$. These systems operate upon the belt B and produce the change or tensions in the belt in the manner heretofore referred to, the effects being that in the head pulley drive system, a relatively high tension reversal is given to the belt at the drive elements of the system, and in the dual or tandem drive system two high tension reversals and one low tension reversal are imparted to the belt at the drive elements. The improvement in the belt splice of the present invention, when incorporated in only the outside of a belt, will effectively take care of the tensions and the changes in tension in a direct flexing cycle, and when incorporated in both the outside and inside of the belt will effectively take care of the tensions and changes in tension in a flexing reversal cycle.

The type of belt B to which the present invention is applied comprises generically a belt body 10 composed of a series of superimposed or laminated plies of fabric belt strength members such as 12, 14, 16, 18 and 20, bound together by cement or a rubber coating composition such as 22 (shown between the said layers) and provided with a rubber cover or envelope 24 vulcanized thereto.

Figs. 3 and 4 of the drawings show a common method of joining the ends of the belt B to produce a continuous structure. This consists of shaping the plies at one end of the belt to produce a step formation and the plies at the other end of the belt to produce a reverse step formation and uniting the meeting ends of the reverse steps in a butt joint, thus producing a stepped butt splice. Thus, the end E of the belt laminae body 10 is shaped or cut to form or produce a step formation having the steps S–1, S–2, S–3 and S–4, and the opposite end $E^1$ of the belt is shaped or cut to form or produce a reverse step formation having the steps $S^1$–1, $S^1$–2, $S^1$–3 and $S^1$–4. The step formation of the belt end E and the reverse step formation of the belt end $E^1$ are then joined to produce a stepped butt splice; this being accomplished by applying a coating of cement, or a rubber coating composition C on the referred to steps and on the ends joining the steps as clearly indicated in Figs. 3 and 4 of the drawings, and of then uniting these ends to produce a butt joint, the butt or abutting ends of the plies 12, 14, 16, 18 and 20 being indicated by $b^1$ (the first butt end), $b^2$ (the second butt end), $b^3$ (the third butt end), $b^4$ (the fourth butt end) and $b^5$ (the fifth butt end), (considered with reference to the top of the belt).

As heretofore stated, I have found that in a stepped butt splice arrangement of this character the weak spot or point of failure is at the second butt of the splice, namely, the butt end $b^2$ (and also the butt end $b^4$ upon reversal). I have found further as hereinabove indicated, that by incorporating or embedding in the rubber cover 24 adjacent the outside ply (such as the ply 12 or 20) a reinforcing fabric member which extends locally over and bridges the butt end $b^2$ (or $b^4$ as the case may be) this weak spot is so strengthened as to effectively eliminate breakdown trouble from this source, and that for the most effective reinforcing fabric I employ a nylon fabric made up of nylon cords which function in the manner above described. In accordance with the present invention I provide for a rubber insert I in the top of the rubber cover and also preferably a rubber insert $I^1$ in the bottom of the rubber cover, each integrated to the belt and extending over an area of the splice to include particularly the said second butt end of the splice and preferably to include both the first and second butt ends ($b^1$ and $b^2$ on the one side, and $b^5$ and $b^4$ on the other side). I then provide further for the embedding in these rubber inserts of these reinforcing fabric layers of nylon cords, the top insert I being provided with a layer of nylon cords N and the bottom insert $I^1$ being provided with a corresponding layer of nylon cords $N^1$; these layers being embedded in each rubber insert adjacent the contiguous ply of the belt.

The top reinforcing nylon layer N is limited in its longitudinal extent and is made to extend locally over so as to bridge in an effective manner the second butt end $b^2$ of the splice; and preferably is also extended locally over so as to bridge as well the first butt end $b^1$ of the splice. Similarly, the bottom reinforcing nylon cord layer $N^1$ is limited in its longitudinal extent and is made to extend locally over so as to bridge effectively the second butt end $b^4$ (taken with reference to the bottom of the belt) and again preferably this reinforcing layer is extended to also include locally and bridge the first butt end $b^5$ of the splice (again taken with reference to the bottom of the belt).

The manner in which this strengthened splice structure is produced is as follows: In producing the stepped formation for the ends E and $E^1$ of the belt the rubber covering on the opposite sides of the belt is cut back as at 26 and 28 and $26^1$ and $28^1$ to make place for the reception of the rubber inserts I and $I^1$. The plies of the stepped splice are then mated and united in the manner above described. The reinforcing fabric members of nylon cords, which are first rubber covered (the latter being indicated at 30) are then placed in the position best indicated in Fig. 3, and a batch of unvulcanized rubber is inserted in the cutaway portion defined for the top by the cutaway walls 26 and $26^1$, and for the bottom by the cutaway walls 28 and $28^1$. The resulting structure is then clamped between heated platens and vulcanized; the vulcanizing of the complete splice being preferably done in sections. In the vulcanizing step all the parts of the splice become integrated.

The manner of producing the improved belt splice of my present invention, the structural and functional characteristics all resulting in an improved belt splice, and the advantages thereof when the belt is employed in both a single head pulley drive or in a dual or tandem drive will, in the main, be fully apparent from the detailed description given above. It will be further apparent that changes may be made in the structural elements of the belt splice and in the steps of the method of producing the same, as well as in the application of the principles of the invention to equivalent belt splices without departing from the spirit of the invention defined in the following claims.

I claim:

1. A belt splice in a belt having a series of laminated plies bound together and provided with a rubber cover, comprising belt ends, the plies of which are stepped in reversed arrangement with the ends of the reverse steps united in a butt joint to produce a stepped butt splice, a rubber insert in the top of the rubber cover integrated to the belt and extending over an area of the splice to include the first and second steps thereof, and a reinforcing fabric layer embedded in the rubber insert adjacent the top ply of the belt and extending locally over and bridging the first and second butt ends of the splice.

2. A belt splice in a belt having a series of laminated plies bound together and provided with a rubber cover, comprising belt ends, the plies of which are stepped in reversed arrangement with the ends of the reverse steps united in a butt joint to produce a stepped butt splice, a rubber insert in the top and a rubber insert in the bottom of the rubber cover integrated to the belt and extending over an area of the splice to include the first and second steps of the top and bottom respectively, and a reinforcing fabric layer embedded in each rubber insert adjacent the contiguous ply of the belt and extending locally and bridging over the first and second butt ends of the splice at both the top and bottom of the belt.

3. A belt splice in a belt having a series of laminated plies bound together and provided with a rubber cover, comprising belt ends, the plies of which are stepped in reversed arrangement with the ends of the reverse steps united in a butt joint to produce a stepped butt splice, a rubber insert in the top of the rubber cover integrated to the belt and extending over an area of the splice to include the first and second steps thereof, and a reinforcing layer of nylon fabric embedded in the rubber insert adjacent the top ply of the belt and extending locally over and bridging the first and second butt ends of the splice.

4. A belt splice in a belt having a series of laminated plies bound together and provided with a rubber cover, comprising belt ends, the plies of which are stepped in reversed arrangement with the ends of the reverse steps united in a butt joint to produce a stepped butt splice, a rubber insert in the top and a rubber insert in the bottom of the rubber cover integrated to the belt and extending over an area of the splice to include the first and second steps of the top and bottom respectively, and a reinforcing layer of nylon fabric embedded in each rubber insert adjacent the contiguous ply of the belt and extending locally over and bridging the first and second butt ends of the splice at both the top and bottom of the belt.

5. A belt splice in a belt having a series of laminated plies bound together and provided with a rubber cover, comprising belt ends, the plies of which are stepped in reversed arrangement with the ends of the reverse steps united in a butt joint to produce a stepped butt splice, a rubber insert in the top of the rubber cover integrated to the belt and extending over an area of the splice to include the second butt end of the splice, and a reinforcing fabric layer embedded in the rubber insert adjacent the top ply of the belt extending over and bridging the said second butt end the splice.

6. The belt splice of claim 5 in which the reinforcing fabric layer comprises a layer of nylon cords.

7. A belt splice in a belt having a series of laminated plies bound together and provided with a rubber cover, comprising belt ends, the plies of which are stepped in reversed arrangement with the ends of the reverse steps united in a butt joint to produce a stepped butt splice, a rubber insert in the top and a rubber insert in the bottom of the rubber cover integrated to the belt and extending over an area of the splice to include the second butt end of the splice at both the top and bottom and a reinforcing layer of nylon cords embedded in each rubber insert adjacent the contiguous ply of the belt, extending over and bridging the said second butt end of the splice at both the top and the bottom of the belt.

References Cited in the file of this patent

UNITED STATES PATENTS

| | | |
|---|---|---|
| 1,635,185 | Kimmich | July 12, 1927 |
| 1,996,529 | Skeyhan | Apr. 2, 1935 |
| 2,056,278 | Kuhn | Oct. 6, 1936 |
| 2,505,354 | Gartrell et al. | Apr. 25, 1950 |
| 2,633,227 | Hutchins | Mar. 31, 1953 |